United States Patent [19]

Akers et al.

[11] Patent Number: 5,353,911

[45] Date of Patent: Oct. 11, 1994

[54] METHOD AND APPARATUS FOR MONITORING THE FLOW OF SOLID MATERIALS

[75] Inventors: David J. Akers; Jurgen Brat, both of Indiana, Pa.

[73] Assignee: CQ Inc., Homer City, Pa.

[21] Appl. No.: 118,395

[22] Filed: Sep. 7, 1993

[51] Int. Cl.$^5$ .............................................. B65G 37/00
[52] U.S. Cl. ...................................... 198/360; 198/524
[58] Field of Search .............. 198/360, 524, 526, 528, 198/535

[56] References Cited

U.S. PATENT DOCUMENTS

| | | | |
|---|---|---|---|
| 4,497,400 | 2/1985 | Otto et al. | 198/468 |
| 4,609,096 | 9/1986 | Doty | 198/464 |
| 4,651,758 | 3/1987 | Kahrau | 198/524 X |
| 4,875,569 | 10/1989 | Oury et al. | 198/360 |

*Primary Examiner*—Cheryl L. Gastineau
*Attorney, Agent, or Firm*—Daniel J. Long

[57] ABSTRACT

A method and apparatus for monitoring the flow of bulk material in a bulk materials handling system is disclosed. A critical stage in the system is identified in which variations in flowability of the material might result in the entire system flow being impeded. Upstream from that critical stage, flow conditions in the critical stage are simulated so that the flow can be interrupted if unsatisfactory flowability conditions exist. A pivotable chute may be positioned at an angle to simulate the flow of particular materials at critical downstream points in a material handling system. If material conditions such as excess moisture impede the rate of flow of the material to a degree which would cause blockages in critical downstream points, the chute will pivot to a secondary position which will temporarily interrupt the material flow.

51 Claims, 2 Drawing Sheets

METHOD AND APPARATUS FOR MONITORING THE FLOW OF SOLID MATERIALS

BACKGROUND OF THE INVENTION

The present invention relates to materials handling systems and more particularly to material handling systems for bulk materials.

Bulk materials such as grains, ores, coal, sand, gravel, cement, wood chips and plastic pellets are often transported or moved from storage in bulk material handling systems in whole or in part by gravity induced flow. The rate of such gravity induced flow may vary widely due to relatively minor differences in particular batches of bulk material which may be transported or moved from storage or due to changes which may occur over time in the same batch of material.

These bulk materials are made up of particles which are in contact with one another but which have voids between them which are filled with a gas, usually air. Essentially they are two-phase, solid-gas systems, and their flowability may be difficult to predict even under ideal conditions. In actual practice, they may often contain additional liquid or solid materials such as moisture, oils, clays, soils and organic contaminants. Aside from such additional materials, the flowability of the bulk material may also be affected by variations in the physical, chemical and physiochemical changes in the bulk material itself. Because such particle-gas systems are often compressible their flowability may be affected by changes in density. Other physical conditions which might affect flowability include variations in particle size, size distribution and shape. Chemical factors would include changes in surface character due to oxidation or other chemical reactions. Physiochemical factors would include changes in adhesion and cohesion which might be induced by changes in ambient temperature. Variations in flowability can cause materials to accumulate in chutes, bunkers, silos and transfer points of material handling systems. Substantial accumulations can result in complete blockage and extensive material handling system outages. These outages are particularly troublesome in coal fired electric generating plants, where interruption of coal supply due to material handling problems can cause loss of generating capacity.

It is, therefore, an object of the present invention to provide a means for easily and inexpensively predicting and preventing material handing problems resulting from variations in flowability conditions.

SUMMARY OF THE INVENTION

The method and apparatus of the present inventions comprise an improvement in materials handling systems for bulk materials. For the purpose of this disclosure solid, free-flowing materials will be considered to be in bulk. Such materials include, but are not limited to, grains, ores, coal, sand, gravel, cement, wood chips and plastic pellets. Bulk handling systems of the type referred to herein are well known in the art and are, for example, further described in the *Mechanical Engineers' Handbook* (John Wiley & Sons, Inc. 1986) pages 953–965. Essentially such systems are designed to convey and store bulk materials, usually in a plurality of stages. Conveyors may include screw conveyors, belt conveyors, bucket elevators, vibrating or oscillating conveyors, pneumatic conveyors and gravity conveyors including gravity chutes. Storage vessels for bulk materials may also be included in such systems and may include bins, silos and hoppers.

Typically, in the design of a bulk material handling system, two or more of such elements are arranged in successive stages with the object of achieving a desired throughput rate for the entire system for the material being conveyed or moved from storage. The achieving of such a desired throughput rate will often depend on the existence of suitable flowability conditions in the bulk material. When such suitable flowability conditions do not occur, the desired throughput rate may not be achieved. In fact, the lack of such flowability may cause the material to stick in one or more of the stages of the system and thus cause flow through the entire system to stop altogether.

In the method of the present invention, then, that stage which would be most likely to cause the flow of the material to be impeded and thus cause the overall system throughput rate not to be achieved is identified. An additional test stage is then included in the system upstream from this critical stage. In this additional stage flow conditions in the critical stage are simulated so that it can be ascertained when unacceptable conditions exist in the critical stage downstream so that flow can be interrupted or other appropriate action may be taken to avoid having the bulk material stick in the critical stage. For example, if a simple materials handling system included a belt conveyor which loaded a bin and a gravity chute which discharged the bin, the critical stage where sticking might occur might be identified as the gravity chute. The additional test stage might be positioned upstream from the gravity chute and preferably before the belt conveyor.

The method and apparatus of the present invention allow on-line determination of the handing characteristics of dry, moist or wet bulk materials. The apparatus simulates material handing problems such as materials sticking in various critical parts of a system. The apparatus may contain flow inhibiting structures that cause material accumulations in the event difficult materials are introduced into the materials handling system, and automatically diverts these materials from the system before damage is done.

For example, when unacceptable flow conditions are sensed downstream the flow of material could be directed such as by diverting wet coal to a stockpile. Alternatively the bulk material could be treated to improve as by mixing wet coal with dry coal. Alternatively a portion of a system could be shut down as by discontinuing use of a portion of a coal stockpile and withdrawing coal from another portion. It will also be apparent that it would be possible to use the test stage as a means to determine if a particular bulk material is acceptable such as by using it to test flowability conditions of a new shipment of coal.

In normal application, the overall system apparatus will include a device which will resemble a chute installed upstream of any restrictions or critical equipment installed in the material handling system. The chute will ordinarily be positioned to intersect a horizontal plane at an acute angle which will be specific to the particular material being handled. In the case of coal, for example, the angle will generally range from between 22° to 30°, depending upon the characteristics of the coal being used and the tendency of the material handling system to clog. For most ores this angle will usually be from between 25° to 32°. A control force is exerted on the chute to restrain it from moving from this angular position during any period in which the flow characteristics of the material are within the tolerance of the material handling system. If, however, the flow rate slows and material having flow characteristics that cannot be accommodated by the system accumulates on the chute, the weight of the accumulated material will overcome the control force and the chute will pivot in a vertical arc to a second angular position. When the chute is in this second angular position, material flow to the rest of the system will be interrupted, and the unacceptable material will be diverted to either a bin or conveyor to be removed either manually or mechanically. Dropping the chute to a steeper angle aids in the removal of the accumulated material and in preparing the chute for additional testing. Those skilled in the art will appreciate that potentially costly blockages which may be otherwise only cleared with considerable difficulty in critical portions of the material handling system downstream are avoided. Preferably, the tripping of the chute will activate a limit switch which will in turn actuate a hydraulic or pneumatic cylinder that will pivot the chute back to its original position.

It will also be understood that the device will preferably be under control of an operator who will be able to override the tripping or activate the mechanism for test purposes.

BRIEF DESCRIPTION OF THE DRAWINGS

The device and method of the present invention are further described with reference to the accompanying drawings in which.

DETAILED DESCRIPTION

Figure 1:
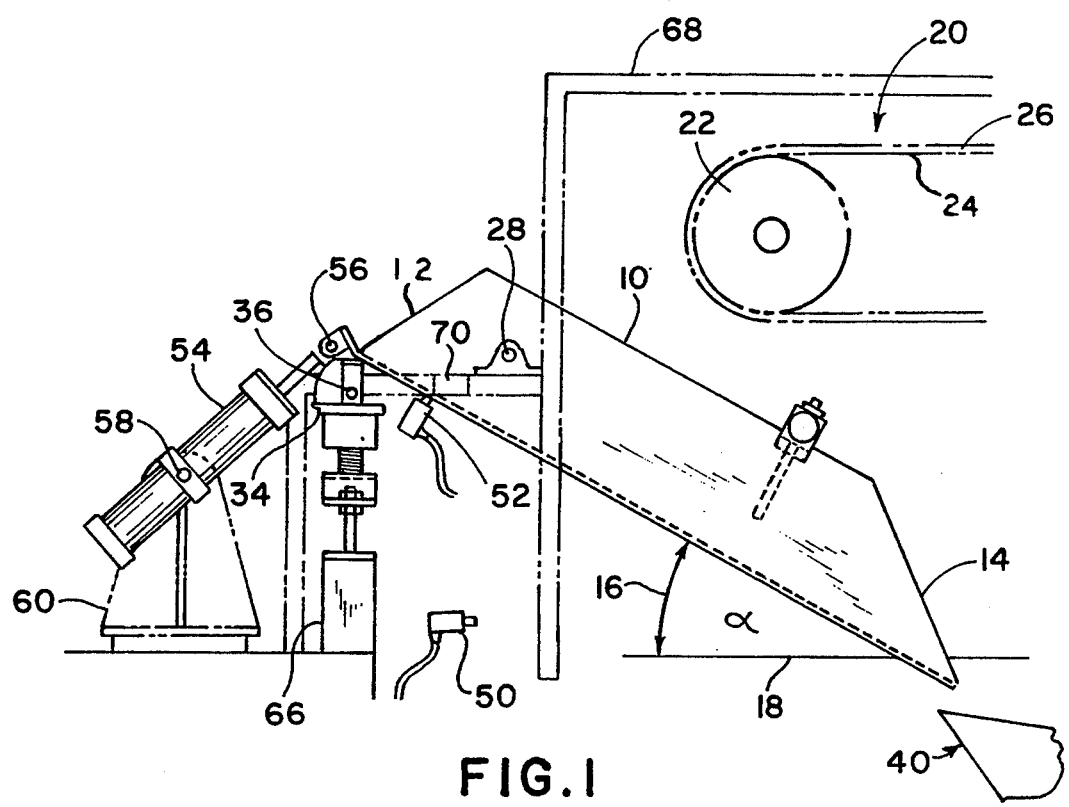
FIG. 1 is a side elevational view of a preferred embodiment of the device of the present invention in which the chute is in its ready first position.
Figure 2:
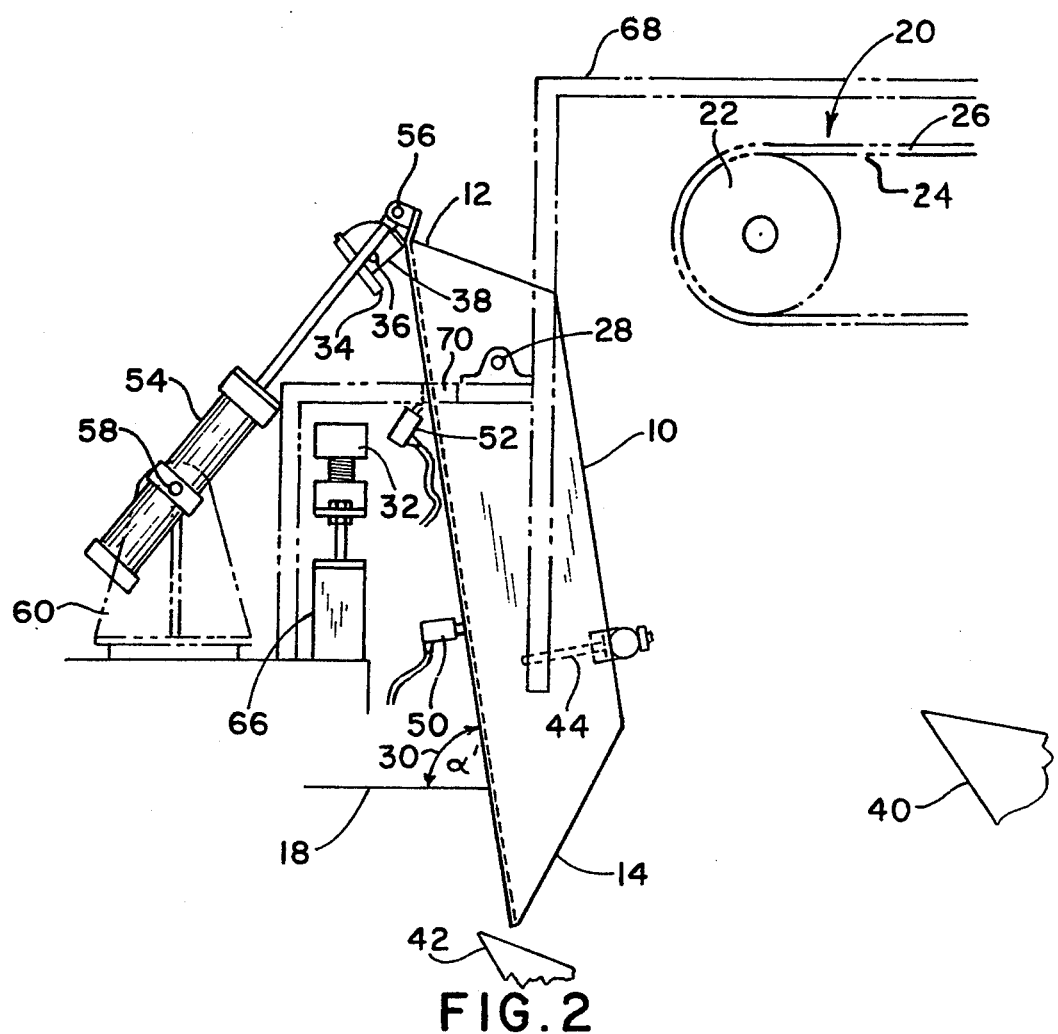
FIG. 2 is a side elevational view of a preferred embodiment of the device of the present invention in which the chute is in its tripped second position.
Figure 3:
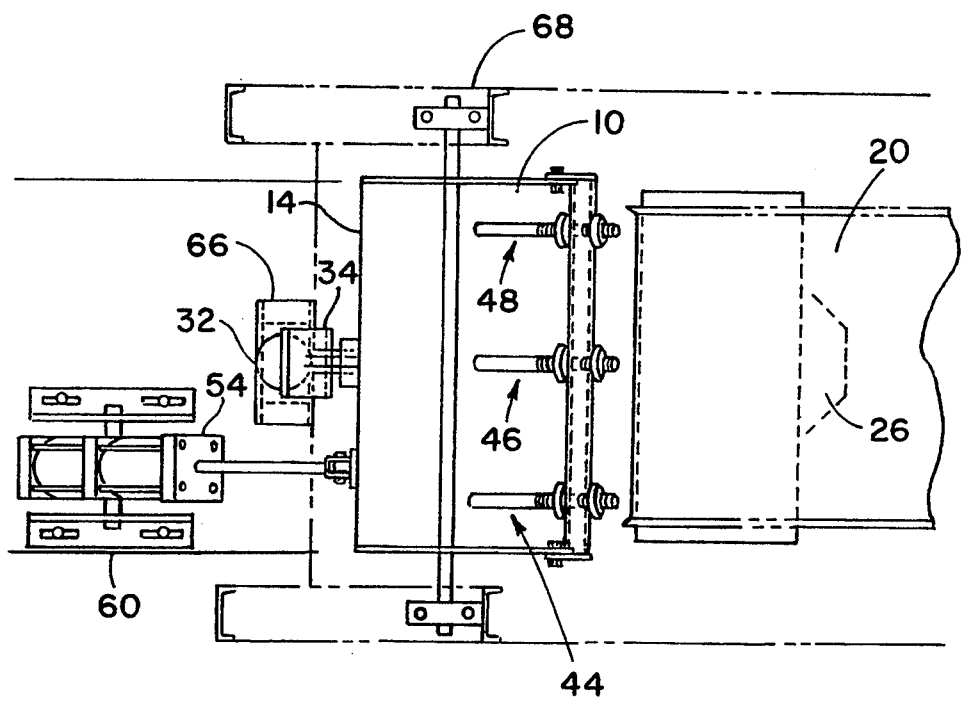
FIG. 3 is fragmented plan view of the device shown in FIG. 1.

Referring particularly to FIG. 1, it will be seen that the flow monitor device of the present invention includes a chute 10 having an upper section 12 and a lower section 14 positioned in a first angular position to intersect a horizontal plane at an acute angle $\alpha$ as at 16 to a horizontal plane 18. The size of the acute angle 16 may vary depending on the specific characteristics of the material being handled. A continuous belt feeder shown generally at 20 and consisting of pulley 22 and belt 24 introduce a flowable material, such as coal 26, to the upper section of said chute. Referring particularly to FIG. 2, it will be seen that the chute pivots on pin 28 which is interposed between its upper section and its lower section through a vertical arc to a second angular position in which the chute intersects the horizontal plane at a larger acute angle $\alpha'$ as at 30. A control force on the chute to restrain the chute from pivoting from the first angular position is provided by means of an electromagnet 32 which when the chute is in its ready first position engages a metal strike plate 34 which is pivotally connected at pin 36 to a projection 38 from the upper section of the chute. A primary connecting conduit 40 (FIGS. 1 and 2) recovers the flowable material from the lower section of the chute when the chute is in the ready first position. When, because of poor flowability conditions, a large amount of material is present on the chute so that the control force is inadequate to restrain the chute from pivoting from said first ready position, the chute will pivot on pin 28 to the tripped second position shown in FIG. 2. From this position material flows from the lower section of the conduit to a secondary connecting conduit 42 (FIG. 2, not shown in FIG. 1).

It will also be observed that the device is equipped with flow restrictors 44, 46 and 48 and a lower limit switch 50 and an upper limit switch 52. A pneumatic piston and cylinder combination 54 is pivotally connected at its upper end by pin 56 to the upper section of the chute and is pivotally connected by pin 58 adjacent its lower end to support 60. The piston and cylinder combination has an air supply orifice and an air vent. The electromagnet is also mounted on a support 66 and the continuous belt feeder is supported by frame 68. A strain gauge 70 is positioned on the frame to give an alert that the chute is about to trip from its first position to its second position.

Figure 4:
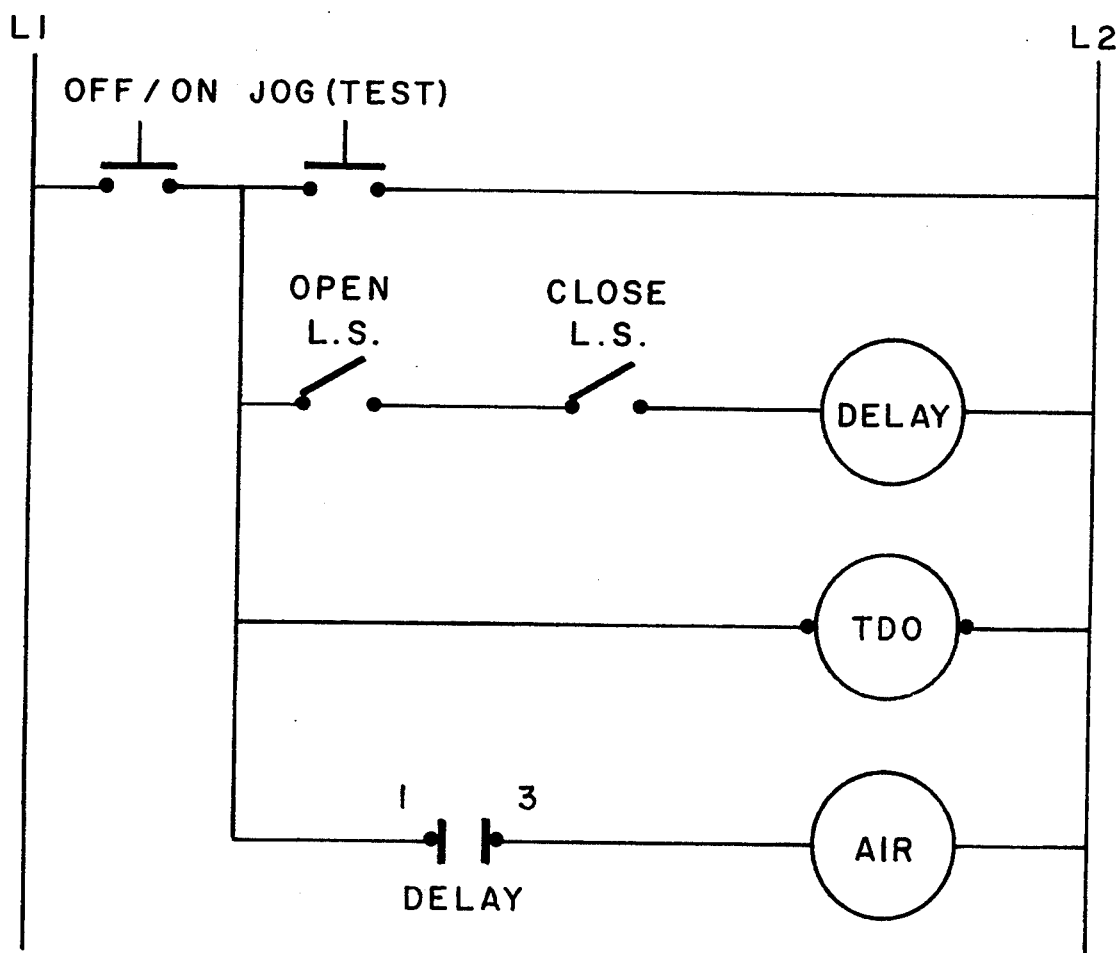
FIG. 4 is a schematic drawing showing controls for the chute angular position.

When the chute is in its tripped second position, as is shown in FIG. 2, it will activate the lower limit switch. The lower limit switch will cause air to be provided in a line (not shown) to the piston and cylinder combination through its air supply orifice such that its piston is moved downwardly to pivot the upper section of the chute downwardly from the tripped second position to the ready first position. When the chute regains its ready first position the upper limit switch will be activated and vent air from the piston and cylinder combination. Referring particularly to FIG. 4, the first ready position of the chute will hold the upper limit switch activated in the open position. When the chute dumps, the upper limit switch will close and stay closed. The chute will dump until the lower limit switch closes which will activate the delay coil and close the delay 1 contact causing the air solenoid to open, allowing air to pressurize the cylinder. The pressurized cylinder will cause the chute to return to the ready position. When the open switch is activated the delay off will start timing out. After the time delay times out, the air cylinder will close and vent the air cylinder.

The method of the present invention is further described with reference to the following examples.

Example 1

A device as was described above was constructed. The chute was constructed of smooth sheet metal and had a length of 52 inches and width of 23½ inches. The electromagnet exerted a maximum force of 180 lbs. and was capable of being operated at less than full capacity. Ambient temperature was about 40° F. Pennsylvania bituminous coal of a size of from 0 to 1½ inches with approximately 16 percent moisture was run through the device. The acute chute angle (as at numeral 16 in the figures) was set at 22° at a coal flow rate of 16 t/hr. The magnetic holding force was set at 90 percent. The device did trip.

Example 2

Bituminous coal similar to that described in Example 1, except that it had a 5.5% moisture content was run through the device described in that example. The chute angle was set at 22° at a coal flow rate of 16 t/hr. The magnetic holding force was set at 85 percent. In this situation the device did not trip.

Example 3

Low moisture bituminous coal dimensionally similar to the coal used in Example 1 was seen through the device at a maximum rate of 25 t/hr. Without spray water and at the magnetic capacity of 80 percent the device did not trip.

Example 4

Example 3 was repeated except that magnetic force was set at 85 percent. In this situation the device did not trip.

Example 5

Example 3 was again repeated except that magnetic force was set at 90 percent. Again the device did not trip.

Example 6

Example 3 was repeated except that magnet power was set at 90 percent and water was uniformly sprayed on the coal at a rate of approximately 5,000 lbs/hr. In this situation the device tripped.

Example 7

Example 3 was repeated except that the coal flow rate was decreased to 8 t/hr. and the magnet force was 70 percent. In this situation the device tripped.

Example 8

To demonstrate the repeatability of these examples, the same conditions used in Example 7 were repeated. Again, the device tripped.

Data from the above examples is summarized in the following Table I.

Although the invention has been described with a certain degree of particularity, it is to be understood that the present disclosure has been made only as an example and that the scope of the invention is defined by what is hereafter claimed.

TABLE I

| Example | Chute Angle α (°) | Coal Flow (t/hr) | Water Spray (Yes/No) | Magnet Force (%) | Chute Trip (%) |
|---|---|---|---|---|---|
| 1 | 22 | 16 | Y | 90 | 90 |
| 2 | 22 | 16 | N | 85 | No Trip |
| 3 | 22 | 25 | N | 80 | 80 |
| 4 | 22 | 25 | N | 85 | 85 |
| 5 | 22 | 25 | Y | 90 | 90 |
| 6 | 22 | 25 | N | 90 | No Trip |
| 7 | 22 | 8 | N | 70 | 70 |
| 8 | 22 | 8 | N | 70 | 70 |

What is claimed is:

1. In a method of operating a materials handling system comprising moving a flowable bulk material which is subject to variations in flowability through a system comprising a plurality of successive handling stages at a desired throughput rate, wherein the improvement comprises:
   (a) identifying from said plurality of stages a critical stage in which variations in the flowability of the bulk material may result in the existence of flow conditions in said critical stage which would result in the overall system throughput rate not being achieved;
   (b) providing an additional test stage upstream from said critical stage and inducing in said additional test stage flow of said bulk material which simulates the flow of the bulk material in the critical stage; and
   (c) sensing flow conditions in said additional test stage and ascertaining the existence of flow conditions which would prevent the overall system throughput rate from being achieved.

2. The method of claim 1 wherein there is performed an additional step of interrupting the flow of the bulk material through the material handling system when in step (c) the existence of flow conditions which would prevent the overall system throughput rate from being achieved is ascertained.

3. The method of claim 1 wherein the bulk material moves through the critical stage by means of gravity induced flow.

4. The method of claim 1 wherein the bulk material moves through the additional test stage by means of gravity induced flow.

5. The method of claim 1 wherein the flow condition in the critical stage and the additional test stage comprise rate of flow.

6. The method of claim 2 wherein the interruption of flow occurs at the additional test stage.

7. The method of claim 6 wherein the additional test stage precedes the other stages in the materials handling system.

8. The method of claim 1 wherein in step (a) the flow condition identified is the stoppage of flow in the critical stage.

9. The method of claim 1 wherein the bulk material is selected from grain, ore, coal, sand, gravel, cement, wood chips and plastic pellets.

10. In a materials handling system comprising an apparatus for moving a flowable bulk material which is subject to variations in flowability through a system comprising a plurality of successive handling stages at a desired throughput rate which stages include a critical stage in which variations in the flowability of the bulk material may result in the existence of flow conditions in said critical stage which would result in the overall system throughput rate not being achieved, wherein the improvement comprises:
   (a) an additional test stage upstream from said critical stage and means for inducing in said additional test stage flow of said bulk material which simulates the flow of the bulk material in the critical stage; and
   (b) means for sensing flow conditions in said additional test stage and ascertaining the existence of flow conditions which would prevent the overall system throughput rate from being achieved.

11. The apparatus of claim 10 wherein there is a means for interrupting the flow of the bulk material through the material handling system when the existence of flow conditions which would prevent the overall system throughput rate from being achieved is ascertained.

12. The apparatus of claim 10 wherein the bulk material moves through the critical stage by means of gravity induced flow.

13. The apparatus of claim 10 wherein the bulk material moves through the additional test stage by means of gravity induced flow.

14. The apparatus of claim 10 wherein the flow condition in the critical stage and the additional test stage comprise rate of flow.

15. The apparatus of claim 11 wherein the interruption of flow occurs at the additional test stage.

16. The apparatus of claim 15 wherein the additional test stage precedes the other stages in the materials handling system.

17. A device for monitoring the rate of flow of a flowable bulk material comprising:
   (a) a chute having an upper section and a lower section positioned in a first angular position to intersect a horizontal plane at an acute angle;
   (b) means for pivoting said chute in a vertical arc to a second angular position in which the chute intersects the horizontal plane at an angle different from said acute angle;
   (c) means for exerting a control force on the chute to restrain said chute from pivoting from said first angular position;
   (d) primary means for recovering the flowable material from the lower section of the chute when the chute is in said first angular position under conditions wherein the control force is adequate to restrain said chute from pivoting from said first angular position; and
   (e) secondary means for recovering the flowable material from the lower section of the chute when the chute is in said second angular position under conditions wherein the control force is inadequate to restrain the chute from pivoting from said first angular position.

18. The device recited in claim 17 wherein the means for exerting a control force on the chute directs a force generally downwardly on the upper section of the chute.

19. The device recited in claim 18 wherein the means for exerting a control force on the chute comprises an electromagnet which exerts a force on a metal plate suspended from the upper section of the chute.

20. The device recited in claim 17 wherein the chute pivots on a pin interposed between its upper section and its lower section.

21. The device recited in claim 20 wherein the upper section of the chute pivots upwardly in a vertical arc when the control force is inadequate to restrain the chute from pivoting from the first angular position.

22. The device recited in claim 21 wherein when the chute is in its second angular position the chute intersects the horizontal plane at an angle which is greater than said acute angle.

23. The device recited in claim 22 wherein a lower limit switch is engaged when the chute is in its second angular position and wherein means are provided for pivoting the chute from its second angular position to its first angular position on engagement of said lower limit switch.

24. The device recited in claim 23 wherein an upper limit switch is engaged when the chute is returned to its first angular position and wherein means are provided to deactivate said means for pivoting the chute from its second angular position to its first angular position.

25. The device recited in claim 24 wherein the means for pivoting the chute from its second angular position to its first angular position is a pneumatic piston and cylinder combination which is fixed at one end to the upper section of the chute and which piston and cylinder is provided with pressurized air on activation of the lower limit switch and which is vented on activation of the upper limit switch.

26. The device recited in claim 17 wherein flow restrictors are positioned on the chute.

27. The device recited in claim 17 wherein flowable material is introduced to the upper section of the chute by means of a continuous belt feeder.

28. The device recited in claim 17 wherein the acute angle between the chute in its first angular position and the horizontal plane is selected based on the desired rate of flow of the flowable material.

29. The device recited in claim 28 wherein the chute will pivot from its first angular position to its second angular position when the rate of flow of the flowable material is less than desired.

30. The device recited in claim 29 wherein the flowable material is coal and wherein the acute angle is between about 22° to about 30°.

31. The device recited in claim 29 wherein the flowable material is ore and wherein the acute angle is from about 25° to about 32°.

32. The device recited in claim 17 wherein a strain gauge is used to provide an alert that the chute is about to pivot from its first position to its second position.

33. A method for monitoring the rate of flow of a flowable bulk material comprising:
   (a) providing a chute having an upper section and a lower section positioned in a first angular position to intersect a horizontal plane at an acute angle and introducing the flowable material to the upper section of said chute;
   (b) providing means for pivoting said chute in a vertical arc to a second angular position in which the chute intersects the horizontal plane at an angle different from said acute angle;
   (c) exerting a control force on the chute to restrain said chute from pivoting from said first angular position;
   (d) providing primary means for recovering the flowable material from the lower section of the chute when the chute is in said first angular position under conditions wherein the control force is adequate to restrain said chute from pivoting from said first angular position; and
   (e) providing secondary means for recovering the flowable material from the lower section of the chute when the chute is in said second angular position under conditions wherein the control force is inadequate to restrain the chute from pivoting from said first angular position.

34. The method recited in claim 33 wherein the control force is directed generally downwardly on the upper section of the chute.

35. The method recited in claim 34 wherein the control force is exerted by means of an electromagnet which exerts a force on a metal plate suspended from the upper section of the chute.

36. The method recited in claim 35 wherein the chute pivots on a pin interposed between its upper section and its lower section.

37. The method recited in claim 36 wherein the upper section of the chute pivots upwardly in a vertical arc when the control force is inadequate to restrain the chute from pivoting from the first angular position.

38. The method recited in claim 37 wherein when the chute is in its second angular position the chute intersects the horizontal plane at an angle which is greater than said acute angle.

39. The method recited in claim 38 wherein a lower limit switch is engaged when the chute is in its second angular position and wherein the chute is pivoted from its second angular position to its first angular position on engagement of said lower limit switch.

40. The method recited in claim 39 wherein an upper limit switch is engaged when the chute is returned to its first angular position to deactivate said pivoting of the chute from its second angular position to its first angular position.

41. The method recited in claim 40 wherein the pivoting of the chute from its second angular position to its first angular position is accomplished by means of a pneumatic piston and cylinder combination which is fixed at one end to the upper section of the chute and which piston and cylinder is provided with pressurized air on activation of the lower limit switch and which is vented on activation of the upper limit switch.

42. The method recited in claim 33 wherein flow restrictors are positioned on the chute.

43. The method recited in claim 33 wherein flowable material is introduced to the upper section of the chute by means of a continuous belt feeder.

44. The method recited in claim 33 wherein the acute angle between the chute in its first angular position and the horizontal plane is selected based on the desired rate of flow of the flowable material.

45. The method recited in claim 44 wherein the chute pivots from its first angular position to its second angular position when the rate of flow of the flowable material is less than desired.

46. The method recited in claim 33 wherein the flowable material is coal and wherein the acute angle is from about 22° to about 30°.

47. The method recited in claim 46 wherein the rate of flow of the flowable material is from about 10 t/hr. to 600 t/hr.

48. The method recited in claim 33 wherein the flowable material is ore and wherein the acute angle is from about 25° to about 32°.

49. The method recited in claim 48 wherein the rate of flow of the flowable material is from about 10 t/hr. to about 600 t/hr.

50. The method of claim 33 wherein strain is measured to provide an alert that the chute is about to pivot from its first position to its second position.

51. The method of claim 33 wherein flowable material accumulated on the chute is removed in the second angular position.

* * * * *